United States Patent [19]

Yang

[11] Patent Number: 4,866,765

[45] Date of Patent: Sep. 12, 1989

[54] TOY TYPE CHILDREN TELEPHONE SET

[76] Inventor: Tai-Cheng Yang, No. 14, 616 Lane, Cheng-Te Rd., Taipei, Taiwan

[21] Appl. No.: 102,589

[22] Filed: Sep. 30, 1987

[51] Int. Cl.$^4$ ............................................. H04M 1/02
[52] U.S. Cl. .................................. 379/374; 379/389; 379/434
[58] Field of Search ................. 379/387, 388, 88, 390, 379/389, 434, 419; 446/301, 175, 299, 300; 40/457, 416, 455, 463, 902

[56] References Cited

U.S. PATENT DOCUMENTS

| H118 | 9/1986 | Biggs et al. | 379/88 |
| 4,707,855 | 11/1987 | Pasinski et al. | 379/376 |
| 4,721,437 | 1/1988 | Mitamura et al. | 379/388 |

FOREIGN PATENT DOCUMENTS 2304613 8/1973 Fed. Rep. of Germany ...... 446/301

OTHER PUBLICATIONS

"Beardroid Phone", DAK.

Primary Examiner—Jin F. Ng
Assistant Examiner—Randall S. Vaas
Attorney, Agent, or Firm—Browdy and Neimark

[57] ABSTRACT

A toy type children telephone set, which mainly comprises a full functional telephone printed circuit board (abbreviated TPCB thereafter). The TPCB is encased in a toy-shaped outer case, instead of a traditional ringing bell. The TPCB is provided with an IC sound generator circuit, which produces a crying, laughing, or singing sound correlating to the embodied toy shape of the outer case when this telephone set is rung. Moreover, in the audio circuit of this TPCB, it is provided with an audio signal conversion circuit, so that through a bridge inverter it controls the rotation of a permanent magnet motor, this motor in turn drives the upper and lower lips at the head portion of the toy-shaped outer case to open or close by following the audio sound signal fluctuation via a driven mechanism and leaf spring switches, which attracts the children to use this telephone set happily.

3 Claims, 4 Drawing Sheets

FIG. 3
FIG. 8
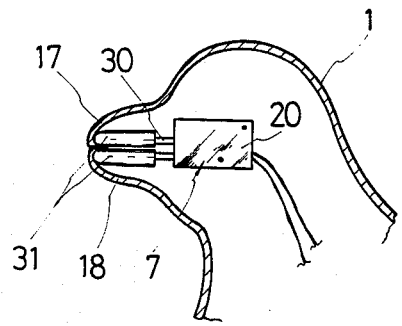
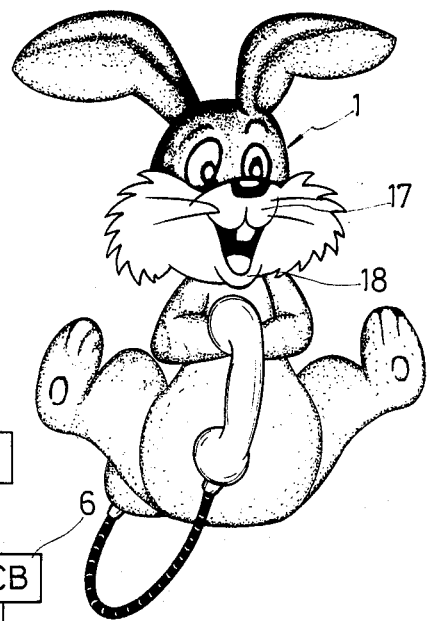
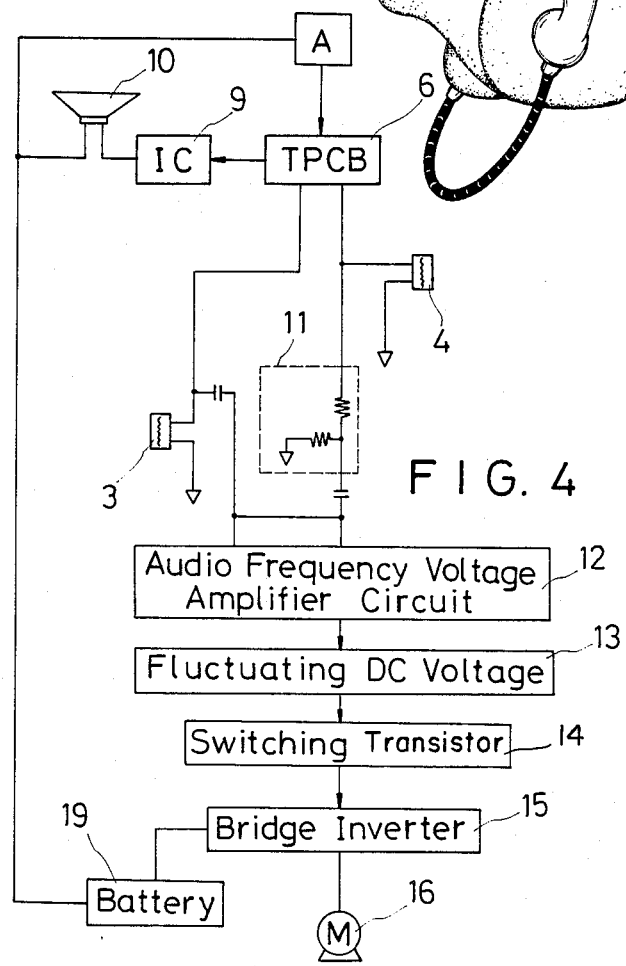
FIG. 4

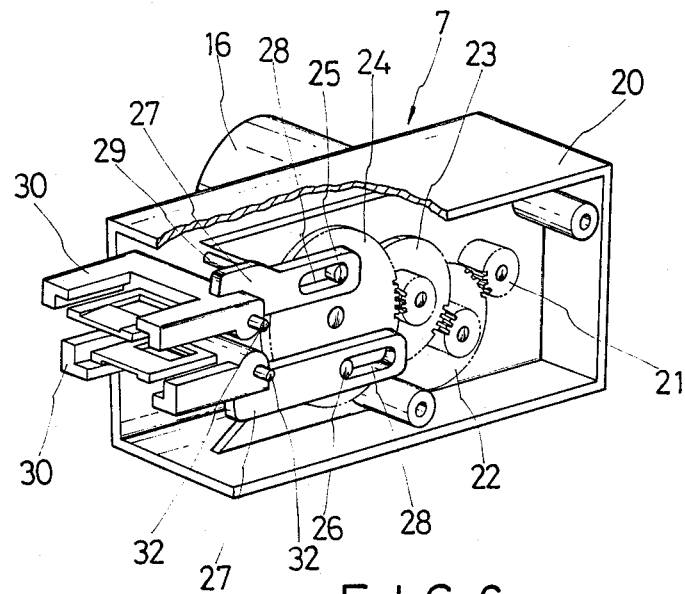
F I G. 6
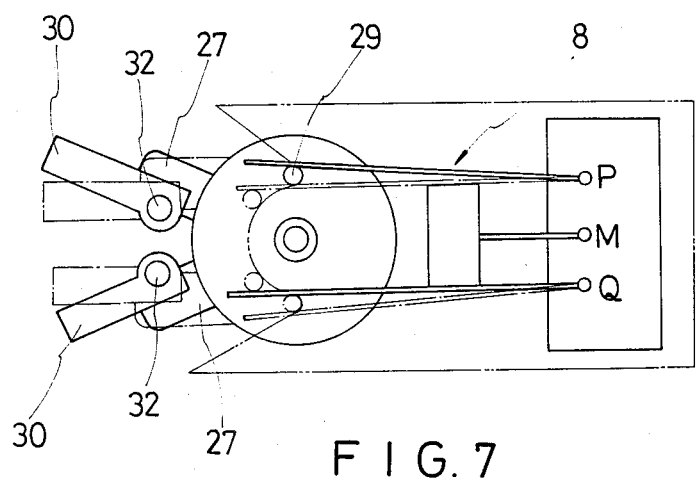
F I G. 7

TOY TYPE CHILDREN TELEPHONE SET

FIELD OF THE INVENTION

The present invention is related to a toy type children's telephone set, in particular, a telephone set with a toy-shaped outer. It is rung by a crying, a laughing, or a singing sound instead of an ordinary ringing bell. Also during a telephone conversation, the upper and lower lips of the toy will open or close by following the audio signal fluctuation.

BACKGROUND OF THE INVENTION

The traditional telephone sets as they are widely used nowadays, almost all have a clumsy appearance. They also lack features which attract children, though their parents provide the children with their own telephone extension sets. But they are scarcely utilized by the children for discussing curricular problems with their schoolmates or saying hellos to their friends. Therefore, this shortcoming needs to be improved.

OBJECTS OF THE INVENTION

The main object of the invention is to solve the above said defects while providing a toy type children telephone set in which, the outer case of this telephone set is embodied into various lovely toys for the children's free choice, while its telephone functions are fully unchanged. Moreover, when a telephone conversation is going on, the lips of the toy will close or open by following the audio signal fluctuation. In this way, it attracts the children to utilize this telephone to discuss curricular problems with their schoolmates or say hello to their friends, whereby, their regular social activities are promoted.

The secandary object of the present invention is to replace the traditional bell of the telephone set with an IC sound generator circuit, which produces a crying, laughing or singing sound correlating to the embodied toy shape of the outer case when this telephone set is ringing.

SUMMARY OF THE INVENTION

A toy type children telephone set is provided, which comprises a full functional TPCB. This TPCB is encased in a toy-shaped case and instead of a traditional ringing bell, the TPCB is provided with an IC sound generator circuit. This sound generator circuit produces a crying, laughing, or singing sound correlating to the embodied toy shape of the outer case when the telephone set is ringing. Moreover, in the audio circuit of this TPCB, it is provided with an audio signal conversion circuit, so that through a bridge inverter, it controls a permanent magnet motor to rotate. This motor in turn drives the upper and lower lips at the head portion of the toy-shaped outer case to open or to close by following the audio sound signal fluctuation via a driving mechanism and leaf spring switches, which attract the children to use this telephone set happily.

BRIEF DESCRIPTION OF THE DRAWINGS

FIG. 3 is the cross section view at the head portion of the toy-shaped outer case of FIG. 2;

FIG. 4 is circuit block diagram of the present invention;

FIG. 6 is the illustrated driven mechanism structure for the toy lips of the present invention;

FIG. 7 is the illustrated leaf spring switch structure of the present invention; and FIG. 8 is an example another embodiment of the present invention.

DETAILED DESCRIPTION OF THE DRAWINGS

Figure 1:
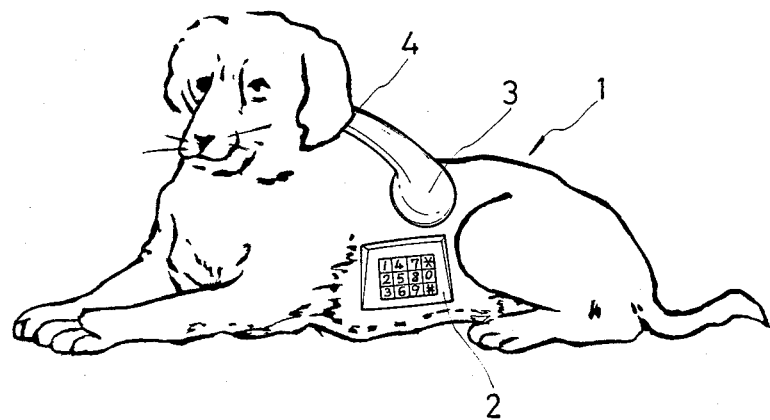
FIG. 1 is the perspective view of an example of one of the embodiments of the present invention.
Figure 2:
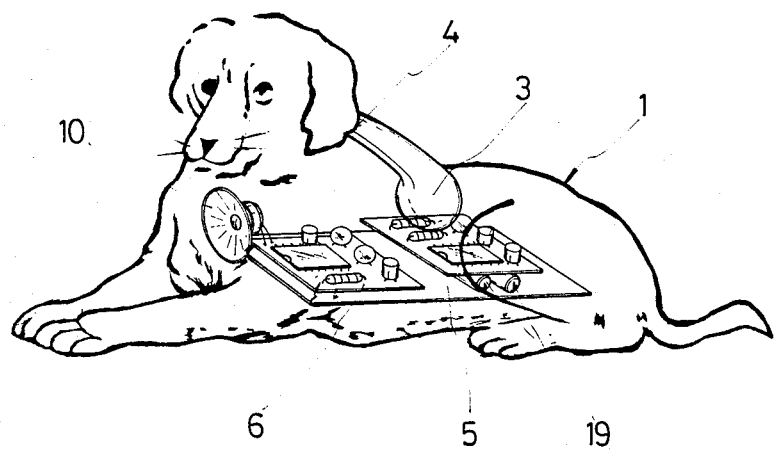
FIG. 2 is the illustrated internal structure of FIG. 1.

Referring to FIG. 1, it can be seen that the keyboard 2 and the hand set, including an earphone 3 and a microphone 4, are installed on the respective proper location of the toy-shaped outer case 1 of the present invention. The toy-shaped outer case 1 of the present invention can be embodied into one of any number of animals, human figures, cartoon characters or animals, or various beloved children story characters. Inside the hollow space just above the base plate 5 of the toy-shaped outer case 1, it is provided with a TPCB 6 as shown in FIG. 2. Also inside the hollow space of the mouth part of the toy-shape outer case 1, a lips driving mechanism 7 and a leaf spring switch 8 are installed as shown in FIGS. 3, 6, 7, so that the lips of the toy-shaped outer case 1 will be driven to open or close by following the audio sound signal fluctuation when a telephone conversation is going on.

Figure 5:
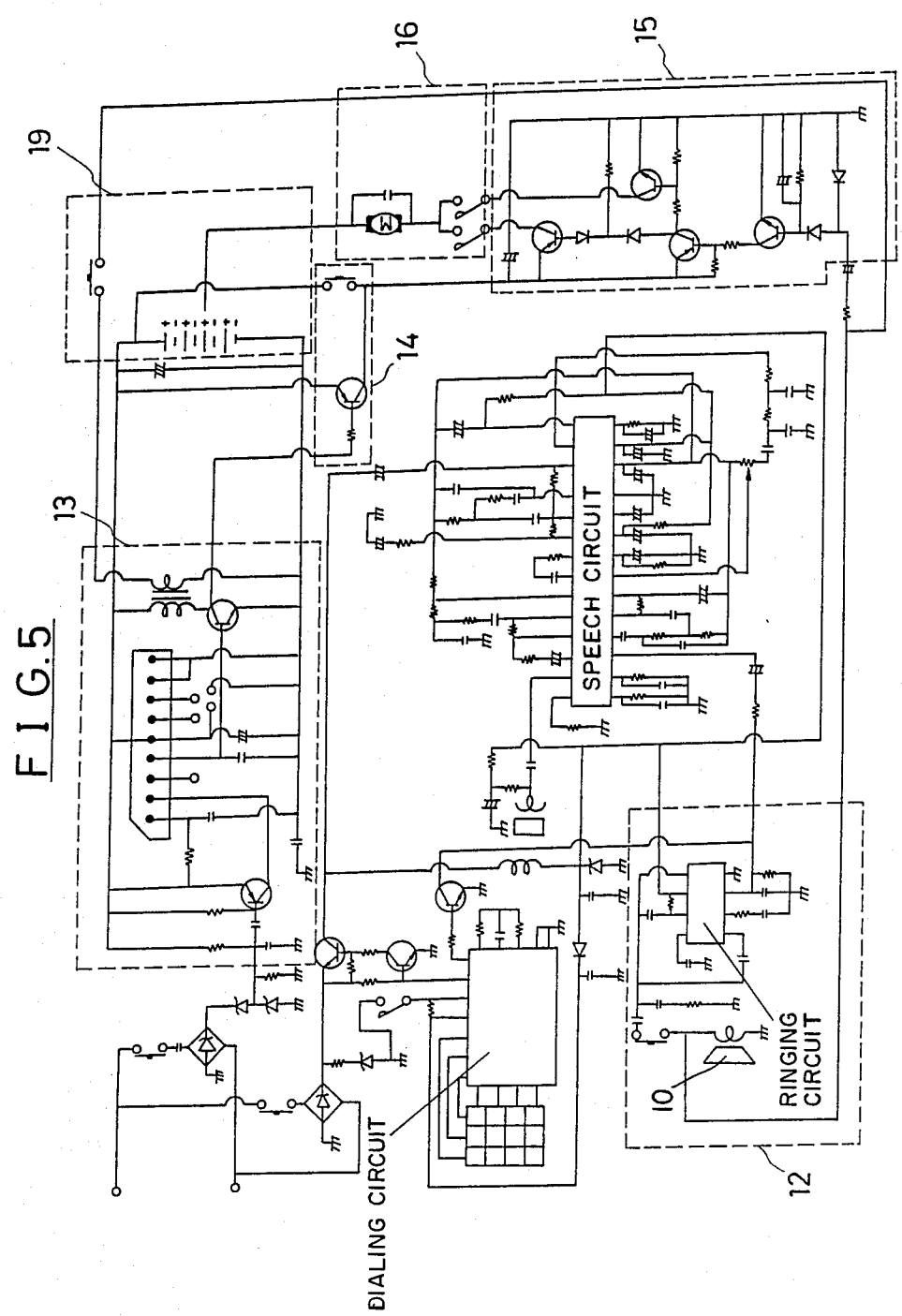
FIG. 5 is an embodiment of the circuit diagram of the present invention.

On the TPCB 6, the traditional bell ringing circuit is replaced by an IC 9 and a sound generator 10, whereby, when this telephone set is ringing, it produces a crying, laughing or singing sound correlating to the embodied toy shape of the outer case to alarm and to amuse the children as shown in FIGS. 4 and 5. Also, a portion of the signal from microphone 4 is tapped out via an attenuator 11, and the signal to the earphone 3 is directly tapped out without any attenuator, and both of these tapped out signals are fed into an audio frequency voltage amplifier 12, thereafter it becomes a fluctuating DC Voltage 13, which is utilized to drive the switching transistor 14 into conducting or cut off states. These state changes therein control the bridge inverter 15 to drive the permanent magnet motor 16 to rotate, which in turn drives the upper lip 17 and lower lip 18 of the mouth portion of the toy-shaped outer case to open or close via the lips driving mechanism 17 and leaf spring switch 8 as shown in FIGS. 3, 6 and 7. The power required to drive the above listed circuits is supplied from the self-contained battery 19 inside the toy-shaped outer case 1. Battery 19 only shares the same ground lines with the telephone battery A, and it is separated completely from the telephone power supply itself.

Referring to FIGS. 6 and 7, the lips driving mechanism 7 and leaf spring switch 8 are contained in a box-shaped body 20 and with their end portion engaged on the permanent magnet motor 16 via a reduction gear train 22. The output axle of this motor is extended into the box-shaped body 20 and then it is attached to a driving gear 21. After it engages with a reduction gear train 22 and 23, the driving gear 21 drives the follower gear 24 to rotate. On the outer surface of the follower gear 24, it is provided with two boss pin 25 and 26, and they are engaged in their respective elongated slots 28 of the driving rods 27. On the inner surface of the follower gear 24, a poking pin 29 is provided as shown in FIG. 7. The rotational movement of the follower gear 24 drives the poking pin 29 to poke the leaf spring switch 8 for controlling the power supply of the motor 16. The driven rods 27 are engaged with respective elongated slots 28 at their rear portions on the respective boss pins 25 and 26 at the outer surface of the follower 24. The front portions of these driven rods 27 are provided with respective receiving seats 30 for receiving the joining plates 31 on the upper and lower lips 17 and 18 at the head portion of the toy-shaped outer case 1, as shown in FIG. 3, so that the lips can be driven to open or close by following the audio sound signal fluctuation. The driving rods 27 are provided with respective pivotal axles 32, and they are pivoted on the box-shaped body 20. When the motor 16 rotates in either the normal forward or reverse direction, the follower gear 24 will be driven to rotate either in normal forward or in reverse direction, and the pair of boss pin 25 and 26 on the outer surface thereof will in turn drive the driving rods 27 to move by taking the pivotal axles 32 as their center of movement, since the lips 17 and 18 at the head portion of the toy-shaped outer case 1 are attached to their respective receiving seats 30 of the driving rods 27 via their respective joining plates 31, therefore, the lips are driven to open or close by following the audio sound signal fluctuation when a telephone conversation is going on.

Referring to FIG. 8, which is another embodiment example of the present invention, its internal structures are similar to the above described structure, but it is wall telephone set. Therefore, the present invention is not limited to the table top telephone sets.

The use of the present invention is the same as the traditional one, except its ringing sound is replaced by a lively crying, laughing, or singing sound, also, when a telephone conversation is going on, the lips of the toy-shaped outer case will open or close by following the audio sound signal fluctuation, which gives the children a lot of fun when they use the present invention.

I claim:

1. A telephone set including a telephone power supply for supplying power to said set, said set comprising:
   an outer case in the shape of a children's toy;
   a dialing key board mounted on said outer case;
   a hand-set mounted on said outer case, said hand-set including an earphone circuit and a microphone circuit, each of said circuits of said hand-set adapted to tap out signals;
   a telephone printed circuit board disposed in a hollow internal space within said outer case and just above a base plate of said outer case;
   a lip driving mechanism connected to lips disposed at a head portion of the outer case;
   a leaf spring switch connected to said lip driving mechanism;
   an IC sound generator circuit disposed on said telephone printed circuit board for producing a crying, laughing or singing sound correlated to the toy shape of the outer case when the telephone set is ringing;
   an audio frequency amplifier connected to said hand-set for receiving said tapped out signals from said earphone circuit and said microphone circuit and generating amplified signals;
   a converter circuit connected to said amplifier for receiving said amplified signals and generating converted signals;
   a bridge inverter connected to said converter circuit for receiving said converted signals and generating control signals;
   a permanent magnet motor connected to said bridge inverter for rotating in a direction controlled by said control signals for driving the lips provided at the head portion of the outer case to open or close by following audio signal fluctuations occurring in said tapped out signals of said earphone and microphone circuits when a telephone conversation is going on;
   a self-contained battery pack separate from the telephone power supply for supplying power to said audio frequency amplifier, said converter circuit, said bridge inverter and said motor, said battery pack being separate from the telephone power supply and being adapted to use a common line therewith.

2. The telephone set as set forth in claim 1, further comprising an attenuator circuit connected to said microphone circuit for receiving said tapped out signals from said microphone circuit and generating attenuated signals, said attenuated signals being received by said amplifier.

3. The telephone set as set forth in claim 1, wherein said outer case is in the shape of a dog or a rabbit.

* * * * *